United States Patent
Taylor

(10) Patent No.: US 8,990,402 B2
(45) Date of Patent: *Mar. 24, 2015

(54) FAST PATH MESSAGE TRANSFER AGENT

(75) Inventor: Bradley Taylor, Menlo Park, CA (US)

(73) Assignee: Critical Path, Inc., Dublin (IE)

(*) Notice: Subject to any disclaimer, the term of this patent is extended or adjusted under 35 U.S.C. 154(b) by 751 days.

This patent is subject to a terminal disclaimer.

(21) Appl. No.: 12/365,111

(22) Filed: Feb. 3, 2009

(65) Prior Publication Data

US 2009/0198788 A1 Aug. 6, 2009

Related U.S. Application Data

(63) Continuation of application No. 10/022,325, filed on Dec. 14, 2001, now Pat. No. 7,487,212.

(51) Int. Cl.
*G06F 13/00* (2006.01)
*H04L 12/58* (2006.01)

(52) U.S. Cl.
CPC ............................... *H04L 51/30* (2013.01)
USPC ............ 709/227; 709/228; 709/206; 709/214

(58) Field of Classification Search
CPC ....................................................... H04L 51/30
USPC .......................... 709/206, 227, 228, 212–214
See application file for complete search history.

(56) References Cited

U.S. PATENT DOCUMENTS

| | | |
|---|---|---|
| 5,446,730 A | 8/1995 | Lee et al. |
| 5,577,226 A | 11/1996 | Percival |
| 5,606,681 A | 2/1997 | Smith et al. |
| 5,765,165 A | 6/1998 | Harper |
| 5,974,414 A | 10/1999 | Stanczak et al. |
| 5,978,452 A | 11/1999 | Cho |
| 6,275,848 B1 | 8/2001 | Arnold |
| 6,396,907 B1 | 5/2002 | Didcock |
| 6,535,517 B1 | 3/2003 | Arkko et al. |
| 6,631,399 B1 | 10/2003 | Stanczak et al. |
| 6,684,308 B2 | 1/2004 | McNeil |

(Continued)

FOREIGN PATENT DOCUMENTS

EP 1349088 10/2003

OTHER PUBLICATIONS

Emma et al. "Exclusive Use Directory and Inode Caching," ip.com, Dec. 1, 1989, 2 pages.

(Continued)

*Primary Examiner* — Kenneth Coulter
(74) *Attorney, Agent, or Firm* — Brooks Kushman P.C.

(57) ABSTRACT

A method of providing a fast path message transfer agent is provided. The method includes receiving bytes of a message over a network connection and determining whether the number of bytes exceeds a predetermined threshold. If the number of bytes is less than a predetermined threshold, then the message is written only to memory. However, if the number of bytes exceeds the predetermined threshold, then some of the bytes (e.g. up to the predetermined threshold) are written to memory, wherein the remainder of the bytes are stored onto the non-volatile storage. If the message was received successfully by each destination, then the message is removed from the memory/non-volatile storage. If not, all failed destinations are identified and the message (with associated failed destinations) is stored on the non-volatile storage for later sending.

22 Claims, 8 Drawing Sheets

(56) References Cited

U.S. PATENT DOCUMENTS

| | | | |
|---|---|---|---|
| 6,721,787 | B1 | 4/2004 | Hiscock |
| 6,751,667 | B1 | 6/2004 | Helliwell |
| 6,757,712 | B1 | 6/2004 | Bastian et al. |
| 6,785,712 | B1 | 8/2004 | Hogan et al. |
| 6,829,617 | B2 | 12/2004 | Sawdon et al. |
| 6,847,984 | B1 | 1/2005 | Midgley et al. |
| 7,003,551 | B2 | 2/2006 | Malik |
| 7,039,671 | B2 | 5/2006 | Cullen |
| 7,089,286 | B1 * | 8/2006 | Malik ............................ 709/206 |
| 7,116,657 | B1 | 10/2006 | Lang |
| 7,293,033 | B1 | 11/2007 | Tormasov et al. |
| 7,441,003 | B1 | 10/2008 | Takeda et al. |
| 7,487,212 | B2 | 2/2009 | Taylor |
| 7,499,529 | B1 | 3/2009 | Kvache et al. |
| 8,316,008 | B1 | 11/2012 | Kohli |
| 2002/0016818 | A1 | 2/2002 | Kirani et al. |
| 2002/0065892 | A1 * | 5/2002 | Malik ............................ 709/206 |
| 2002/0120697 | A1 | 8/2002 | Generous et al. |
| 2002/0120748 | A1 | 8/2002 | Schiavone et al. |
| 2002/0194319 | A1 | 12/2002 | Ritche |
| 2003/0061269 | A1 | 3/2003 | Hathaway et al. |
| 2003/0105800 | A1 | 6/2003 | Cullen |
| 2003/0110248 | A1 | 6/2003 | Ritche |
| 2003/0135522 | A1 | 7/2003 | Doyle et al. |
| 2004/0153549 | A1 | 8/2004 | Naito et al. |
| 2004/0267838 | A1 | 12/2004 | Curran et al. |
| 2005/0033748 | A1 | 2/2005 | Kazar et al. |
| 2007/0110036 | A1 | 5/2007 | Lang |
| 2009/0172188 | A1 | 7/2009 | Taylor |

OTHER PUBLICATIONS

Process Software, LLC: "PMDF System Manager's Guide", Order No. N-5301-61-NN-N, 'Online! Sep. 2001, pp. 33-1-33-7.

Superspeed Software Inc.: "Increasing performance in the Mission Critical Envirmonment", White Paper, 'Online!, Nov. 29, 2001, pp. 1-12.

Postel J.B.: "Simple Mail Transfer Protocol", Internet Specification RFC, RFC 821, Aug. 1982, pp. 1-68.

International Search Report PCT/GB02/05618; dated Oct. 7, 2003.

Non-Final Office Action Mailed Jun. 28, 2010 in Co-pending U.S. Appl. No. 12/344,123, filed Dec. 24, 2008.

Final Office Action Mailed Oct. 29, 2010 in Co-pending U.S. Appl. No. 12/344,123, filed Dec. 24, 2008.

Non-Final Office Action Mailed Jun. 21, 2013 in Co-pending U.S. Appl. No. 12/344,123, filed Dec. 24, 2008.

Co-pending U.S. Appl. No. 10/022,325, filed Dec. 14, 2001.

Notice of Allowance Mailed Oct. 3, 2008 in Co-pending U.S. Appl. No. 10/022,325, filed Dec. 14, 2001.

Non-Final Office Action Mailed Jun. 12, 2008 in Co-pending U.S. Appl. No. 10/022,325, filed Dec. 14, 2001.

Final Office Action Mailed Oct. 31, 2007 in Co-pending U.S. Appl. No. 10/022,325, filed Dec. 14, 2001.

Non-Final Office Action Mailed May 4, 2007 in Co-pending U.S. Appl. No. 10/022,325, filed Dec. 14, 2001.

Advisory Action Mailed Jan. 17, 2007 in Co-pending U.S. Appl. No. 10/022,325, filed Dec. 14, 2001.

Final Office Action Mailed Aug. 14, 2006 in Co-pending U.S. Appl. No. 10/022,325, filed Dec. 14, 2001.

Non-Final Office Action Mailed Oct. 7, 2005 in Co-pending U.S. Appl. No. 10/022,325, filed Dec. 14, 2001.

Co-pending U.S. Appl. No. 12/344,123, filed Dec. 24, 2008.

Co-pending U.S. Appl. No. 11/279,855, filed Apr. 14, 2006.

Final Office Action Mailed Mar. 10, 2010 in Co-pending U.S. Appl. No. 11/279,855, filed Apr. 14, 2006.

Non-Final Office Action Mailed Oct. 9, 2009 in Co-pending U.S. Appl. No. 11/279,855, filed Apr. 14, 2006.

Advisory Action Mailed Sep. 4, 2009 in Co-pending U.S. Appl. No. 11/279,855, filed Apr. 14, 2006.

Final Office Action Mailed Jun. 19, 2009 in Co-pending U.S. Appl. No. 11/279,855, filed Apr. 14, 2006.

Non-Final Office Action Mailed Jan. 14, 2009 in Co-pending U.S. Appl. No. 11/279,855, filed Apr. 14, 2006.

Final Office Action Mailed Jul. 10, 2008 in Co-pending U.S. Appl. No. 11/279,855, filed Apr. 14, 2006.

Non-Final Office Action Mailed Dec. 12, 2007 in Co-pending U.S. Appl. No. 11/279,855, filed Apr. 14, 2006.

* cited by examiner

FAST PATH MESSAGE TRANSFER AGENT

BACKGROUND OF THE INVENTION

1. Field of the Invention

The present invention relates to sending email messages between servers, and particularly to a fast path message transfer agent for these email messages.

2. Description of the Related Art

FIG. 1 illustrates a simplified email system 100 that can send or receive messages over the Internet 103. System 100 typically uses Simple Mail Transfer Protocol (SMTP) to send messages between servers 101 and 102. Clients 104-106 can use server 101 to route their email, whereas clients 107-109 can use server 102 to route their email.

Servers 101 and 102 temporarily store and re-route the email messages from clients 104-109 to the appropriate destinations. Specifically, Message Transfer Agents (MTAS) 110 and 111, installed in servers 101 and 102, respectively, can route messages according to addresses designated in the email. MTAs can use retry logic and queues (explained in further detail below) to efficiently direct the messages.

FIGS. 2A and 2B illustrate a flow chart of a standard embodiment of an MTA operation. In step 201, the MTA, in a first email server, receives a network connection from a second email server. The MTA can then receive bytes of a message over this connection in step 202. In step 203, the MTA writes those bytes into a dynamic (e.g. DRAM or SRAM) memory to quickly capture those bytes and then stores those bytes into a non-volatile storage device until delivery to their final destination(s) (i.e. the clients associated with the first email server).

If all bytes of the message have not been received, as determined in step 204, then the process returns to step 202 to receive additional bytes of the message over the connection. If all bytes of the message have been received, then the MTA responds to the server that the message has been successfully received in step 205. Note that if a system failure (e.g. a full condition or power outage) occurs during steps 201-203, then the MTA can respond to the server with an error message, wherein the server can re-establish network connection at a later point in time to resend the message. In this case, the MTA can delete any bytes of the message that were written to the memory or stored in the non-volatile storage device.

Assuming successful receipt, the stored bytes for a message in the non-volatile storage device are now in a queue of messages to be re-routed to their destinations. When a message is next in queue, the MTA retrieves the message from the non-volatile storage in step 206. The MTA attempts to send the message to each destination designated by the message in step 207. If the message was not successfully delivered to all destinations, as determined by step 208, then the MTA can identify the failed destinations in step 210 and then retry delivering the message to the failed destinations after some delay in step 211. In one embodiment, the message and its failed destinations can be returned to a queue in the non-volatile storage device, wherein the process returns to step 206. If the message was successfully delivered to all destinations, then the message is removed from the non-volatile storage device in step 209 and the delivery process for that message ends.

Continuously storing and accessing messages on the non-volatile storage device undesirably increases the time of email delivery. Therefore, a need arises for a method of decreasing email delivery time.

SUMMARY OF THE INVENTION

A method of providing a fast path message transfer agent (MTA) is provided. A typical implementation of the fast path MTA can increase performance by 3× the speed of a standard MTA. The method includes receiving bytes of a message over a network connection and determining whether the number of bytes exceeds a predetermined threshold. If the number of bytes is less than a predetermined threshold, then the message is written only to memory. However, if the number of bytes exceeds the predetermined threshold, then the message is written to memory and a non-volatile storage device. In one embodiment, some of the bytes (e.g. up to the predetermined threshold) are written to memory, wherein the remainder of the bytes are stored into the non-volatile storage device.

Writing the message to the memory and the non-volatile storage device can further include determining whether all bytes of the message have been received. If not, then additional bytes of the message can be received over the network connection. The additional bytes can be written into the non-volatile storage device.

The method can further including accessing the message, sending the message to each destination, and determining whether the message was received successfully by each destination. If the message was received successfully by each destination, then the message can be removed from the memory (or from the memory and the non-volatile storage device, as appropriate) and a successful receipt of the message can be indicated.

If the message was not received successfully by each destination, then all failed destinations can be identified and the message can be stored in the non-volatile storage device. However, a successful receipt of the message can still be indicated. The failed destinations can be retried after a delay until the message is successfully received. At this point, the message can be removed from the non-volatile storage device.

A computer program product is also provided. The product can include a computer usable medium having a computer readable program code embodied therein for providing a fast path message transfer agent. The computer readable program code can comprise computer readable program code that receives bytes of a message over a network connection and computer readable program code that determines if the number of bytes exceeds a predetermined threshold. If the number of bytes is less than the threshold, then the message is written only to memory. However, if the number of bytes exceeds the threshold, then the message is written to memory and a non-volatile storage device. The product can further comprise computer readable program code that writes some of the bytes (for example, up to the predetermined threshold) to memory and computer readable program code that stores a remainder of the bytes in the non-volatile storage device.

Another embodiment of a method for providing a MTA is provided. This method can include receiving a network connection from an email server, receiving addresses of any recipients, and determining whether connections can be formed to the recipients. If so, then bytes of a message can be received and sent to the recipients. If not, then the connections can be retried for a predetermined number of times.

If the bytes are received by the recipients, then the MTA can respond to the server that the message was successfully received by the recipients. On the other hand, if not all the bytes are received by the recipients, then the MTA can respond to the server that message transfer was not successful. In the case that retrying exceeds the predetermined number of times, then the MTA can respond to the server that connections to the recipients were not successful.

Yet another embodiment of a method of providing a fast path MTA is provided. This method can include receiving a network connection from an email server, receiving bytes of a message over the network connection, and determining whether the number of bytes exceeds a predetermined threshold. In this embodiment, if the number of bytes does not exceed a predetermined threshold not, then the message is written only to a memory. However, if the number of bytes exceeds a predetermined threshold, then the message is written only to non-volatile storage.

If all bytes of the message have not been received, then additional bytes of the message can be received. However, if the total number of bytes exceeds the predetermined threshold, then the total number of bytes are stored in the non-volatile storage device and any bytes of the message written to memory are erased.

DETAILED DESCRIPTION OF THE DRAWINGS

Figure 1:
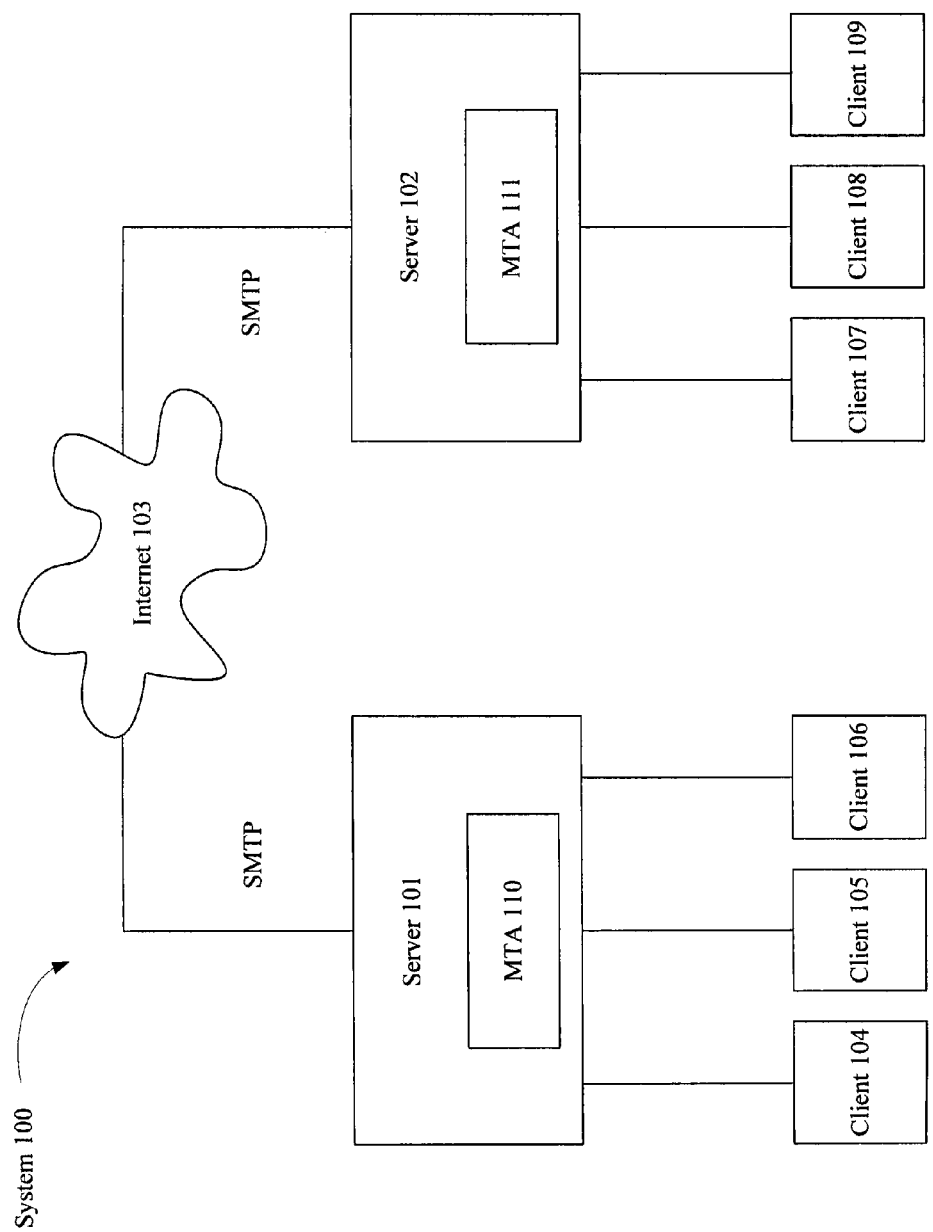
FIG. 1 illustrates a simplified block diagram of an email system that can send or receive messages over the Internet.
Figure 2A:
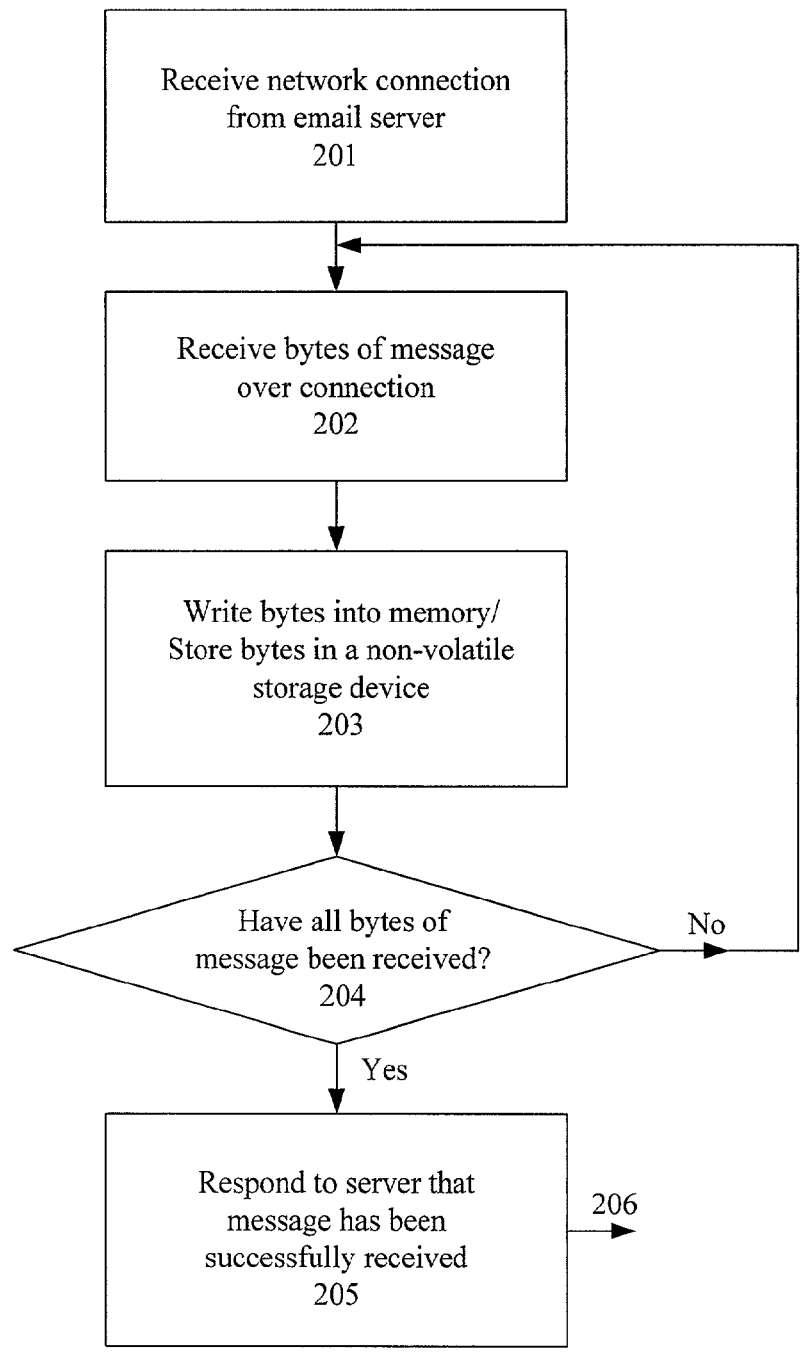
FIGS. 2A and 2B illustrate a flow chart of one embodiment of a standard Message Transfer Agent (MTA) operation.
Figure 2B:
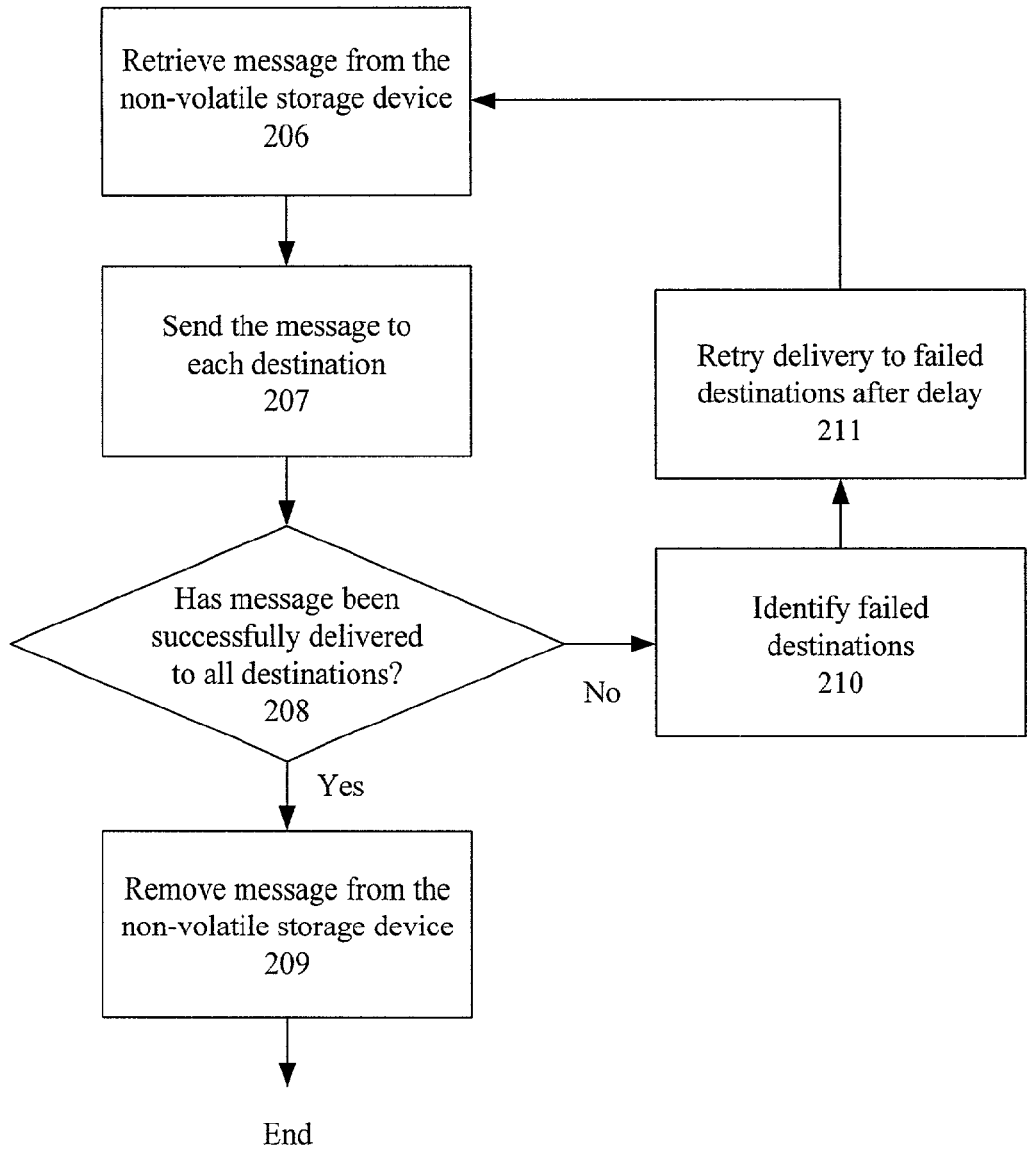
Figure 3A:
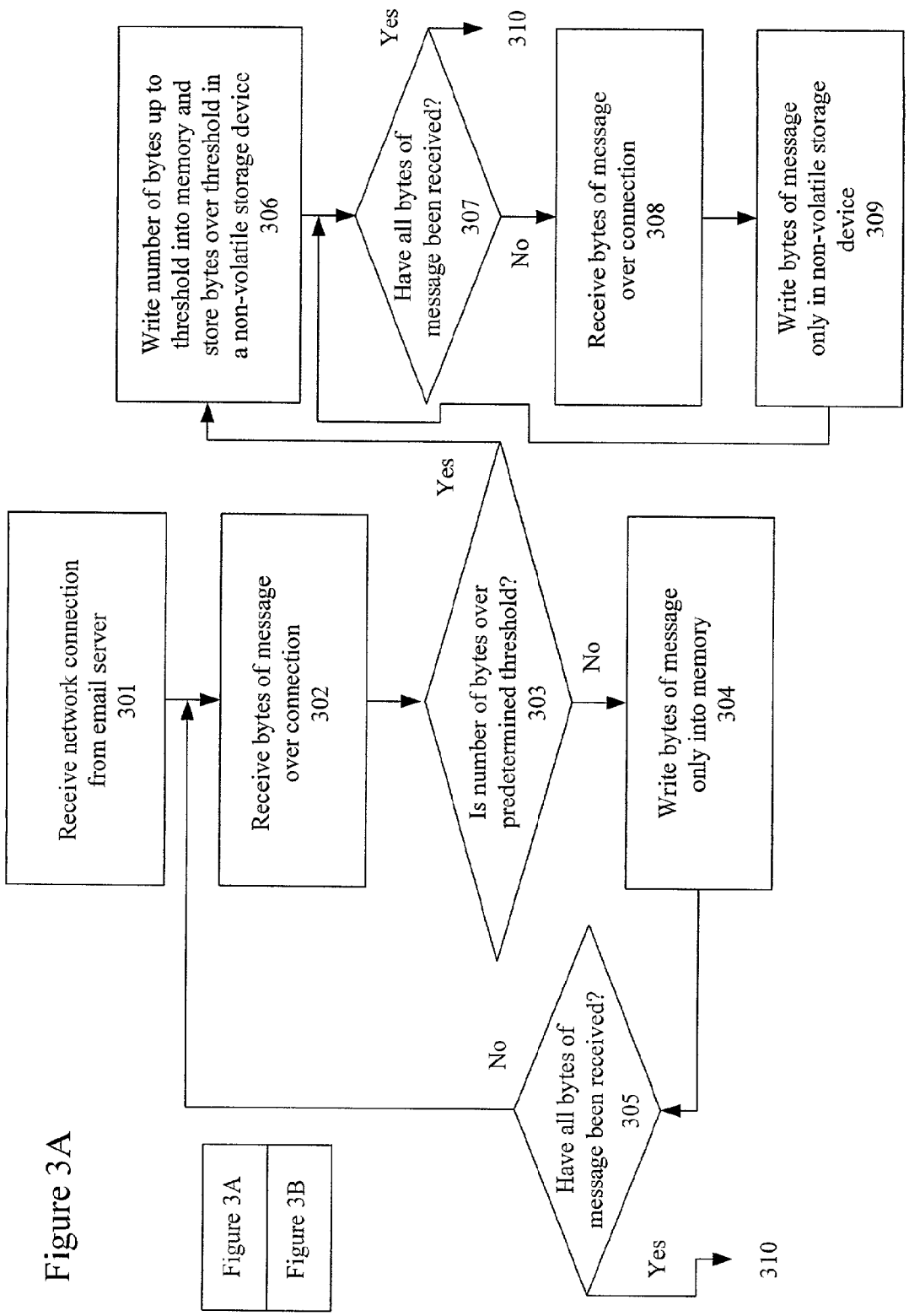
FIGS. 3A and 3B illustrate a flow chart of one embodiment of a fast path MTA operation.
Figure 3B:
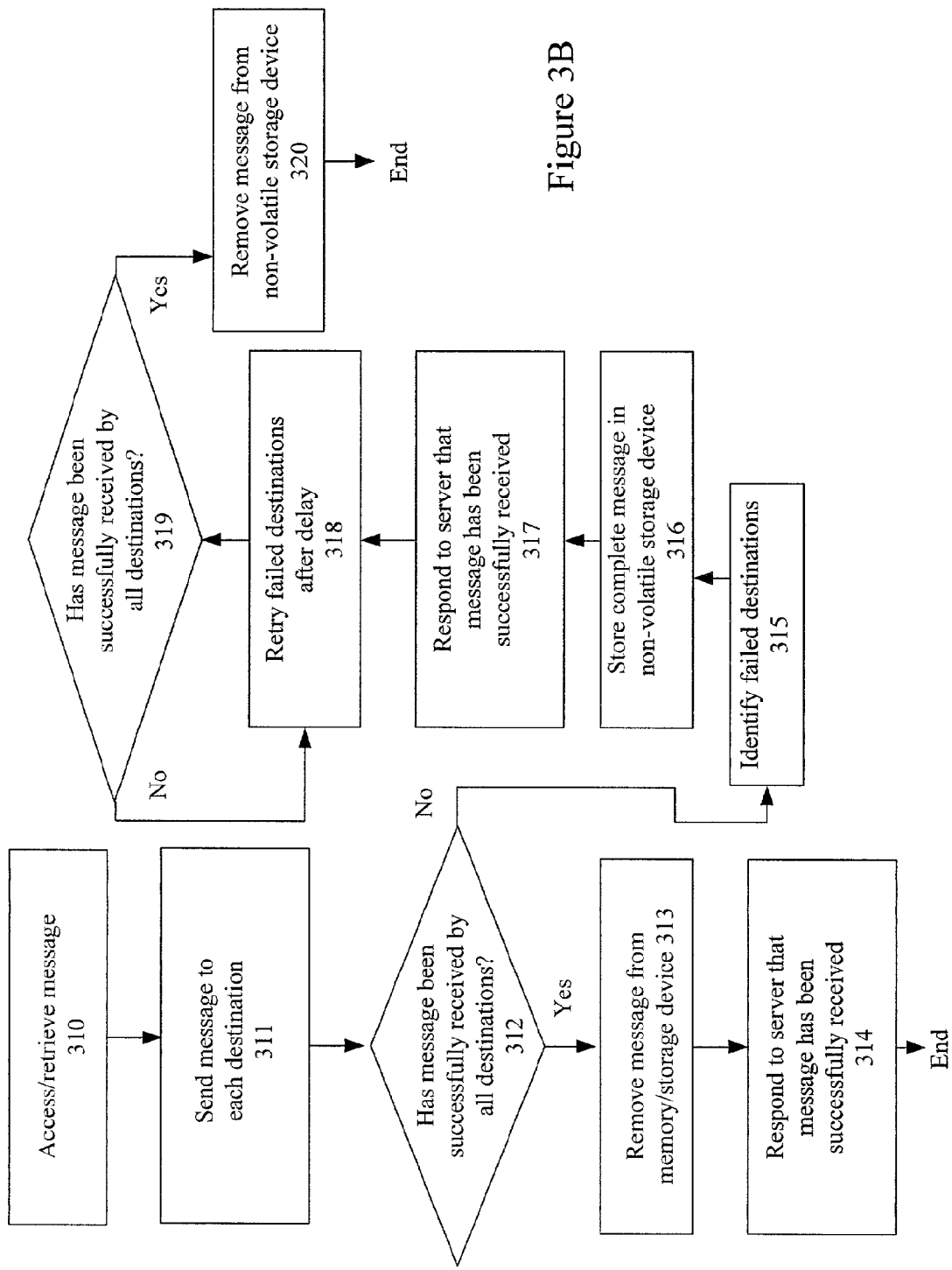

FIGS. 3A and 3B illustrate a flow chart of one embodiment of a fast path MTA operation. In this operation, storing a message in a non-volatile storage device is limited to circumstances where the number of bytes exceeds a predetermined threshold. The predetermined threshold is set so that a majority of the messages can be written only to memory. In this manner, the delivery time can be significantly reduced compared to the standard MTA operation (FIGS. 2A and 2B) that must include access time to the non-volatile storage.

In step 301, the MTA receives a network connection from the email server. In step 302, the MTA receives bytes of a message over that connection. If the total number of bytes (i.e. bytes written to memory in combination with those bytes just-received) does not exceed a predetermined threshold, as determined in step 303, then the received bytes are written to memory in step 304. If all bytes of the message have not been received, as determined in step 305, then the MTA returns to step 302 to receive additional bytes.

If the total number of bytes exceeds a predetermined threshold in step 303, then the number of bytes up to the threshold are written to memory and the remainder of bytes is stored in a non-volatile storage device in step 306. If all bytes of the message have not been received, as determined in step 307, then the MTA receives additional bytes of the message over the connection in step 308. These additional bytes of the message are stored only onto the non-volatile storage device in step 309. Once all bytes of the message have been received (steps 305/307), the bytes for the message in memory (or in the memory and on the non-volatile storage device) can be re-routed to their destinations.

Thus, the MTA can follow one of two processes depending on the predetermined threshold. In one embodiment, the predetermined threshold is set so that a majority of the messages can be written only to memory. For example, the threshold can be set to 32 k, although other thresholds (such as 16 k or 64 k) can also be used depending on the projected size of the files. Because the MTA stores onto and accesses the non-volatile storage device infrequently (and in preferred cases, not at all), this process is significantly faster than the prior art process. In fact, for typical implementations, this fast path MTA process can be three times as fast as the prior art MTA process.

To re-route the message to its destination(s), the MTA accesses the message from memory (or accesses a portion of the message from memory and retrieves the remainder of the message from the non-volatile storage device) in step 310. The MTA attempts to send the message to each destination designated by the message in step 311. If the message was successfully delivered to all destinations, as determined by step 312, then the message can be removed from memory (or memory and the non-volatile storage device) in step 313. The MTA can respond to the server that the message was successfully received in step 314 and the delivery process for that message ends.

If the message was not successfully delivered to all destinations, as determined by step 312, then the MTA can identify the failed destinations in step 315 and then store the complete message (and the failed destinations) onto a non-volatile storage in step 316. In one embodiment, the message and its failed destinations can be placed in a queue in the non-volatile storage device. Note that, in addition to system failure or memory problems at the destination, a failed delivery can occur because of a condition determined at the time of delivery. For example, if the message is an 8-bit message and the destination only supports 7-bit, then a bit conversion must be done before the message can be successfully delivered to that destination. The bit conversion of the 8-bit message can be done by a tool activated by the MTA, wherein after conversion the 7-bit message can be put in the queue of the non-volatile storage device. Once the message is stored onto the non-volatile storage device, the MTA can respond to the server that the message has been successfully received in step 317. The MTA can retry sending the message to the failed destinations after a predetermined delay in step 318.

If the message is not successfully received by all destinations, as determined in step 319, then the MTA can repeat steps 318 and 319. Note that in one embodiment, after a predetermined of retries, the process proceeds to step 320. Once a message is successfully received by all destinations, then the message can be removed from the non-volatile storage device in step 320 and the delivery process for that message ends. Note that receiving another network connection from an email server can occur at any time. Thus, one set of steps 301-320 can be interleaved with one or more other sets of steps 301-320, as needed.

Figure 4:
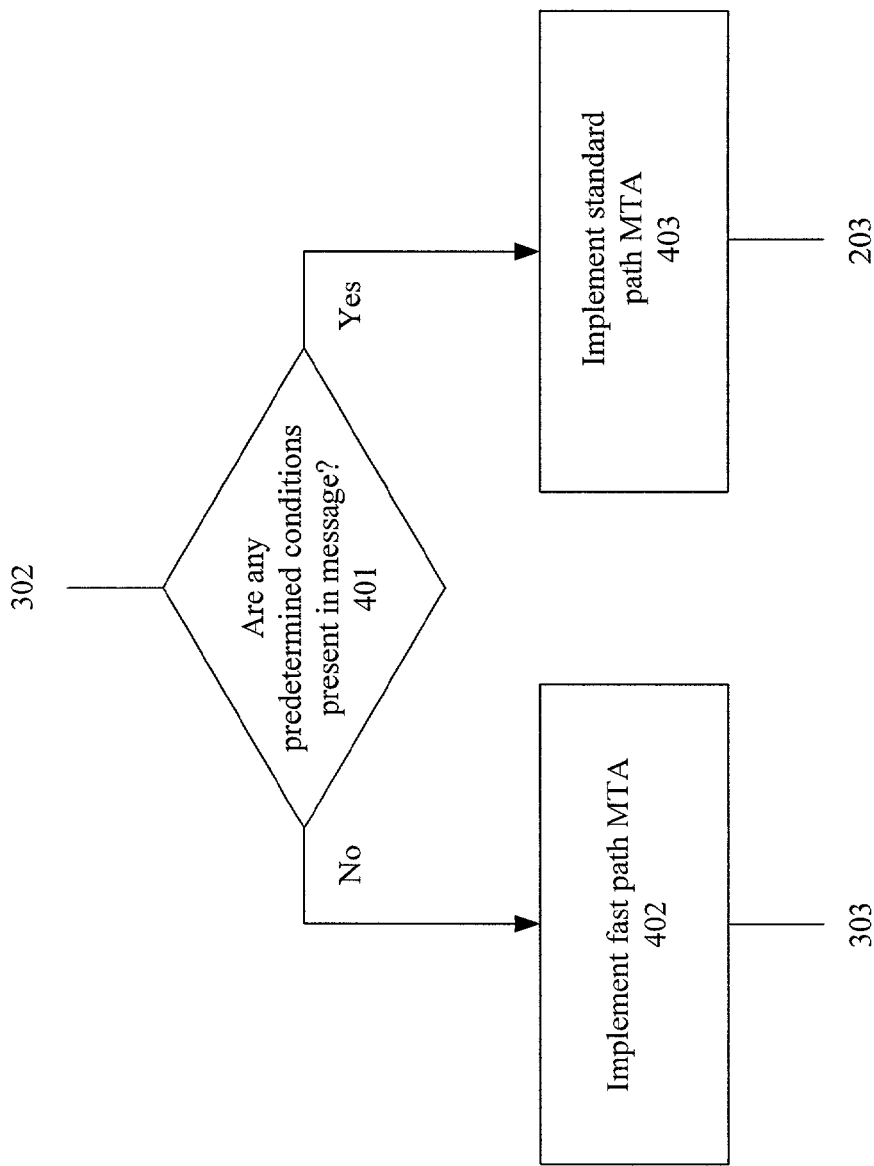
FIG. 4 illustrates an embodiment in which the fast path MTA operation can be disabled and the standard MTA operation can be enabled.

In one embodiment, the fast path MTA can be disabled, thereby activating the standard path MTA described in FIGS. 2A and 2B. For example, referring to FIG. 4, after receiving the bytes of the message over the connection in step 302 (FIG. 3A), step 401 can determine if any predetermined conditions are present in the message. If no predetermined conditions are present, then the fast path MTA process can be implemented (step 402) by proceeding to step 303 (also FIG. 3A). If predetermined conditions are present, then the standard path MTA process can be implemented (step 403) by proceeding to step 203 (FIG. 2A).

Predetermined conditions can include, by way of example and not limitation, enabled filtering (e.g. anti-virus, anti-spam, and content-filtering), disabled Lightweight Directory Access Protocol (LDAP) relaying (wherein LDAP includes a set of protocols for accessing information directories including email addresses etc.), enabled encryption, enabled LDAP "sender masquerading" (feature that refers to the LDAP directory to replace the sender's name with another entry, such as the "official" email address for the sender), enabled Realtime Blackhole List (RBL) (includes a listing of IP addresses whose owners refuse to stop spam), enabled "received for header" (feature that causes the MTA to take a message that is addressed to several destinations and transform the message into several messages, each message addressed to one of the several destinations), and enabled "sender check" (feature that ensures the sender's domain exists in the Domain Name System (DNS), an Internet service that translates domain names into IP addresses). Note that although the predetermined conditions indicated above relate to the configuration of the server, other predetermined conditions could exist to trigger disabling of the fast path MTA.

Figure 5:
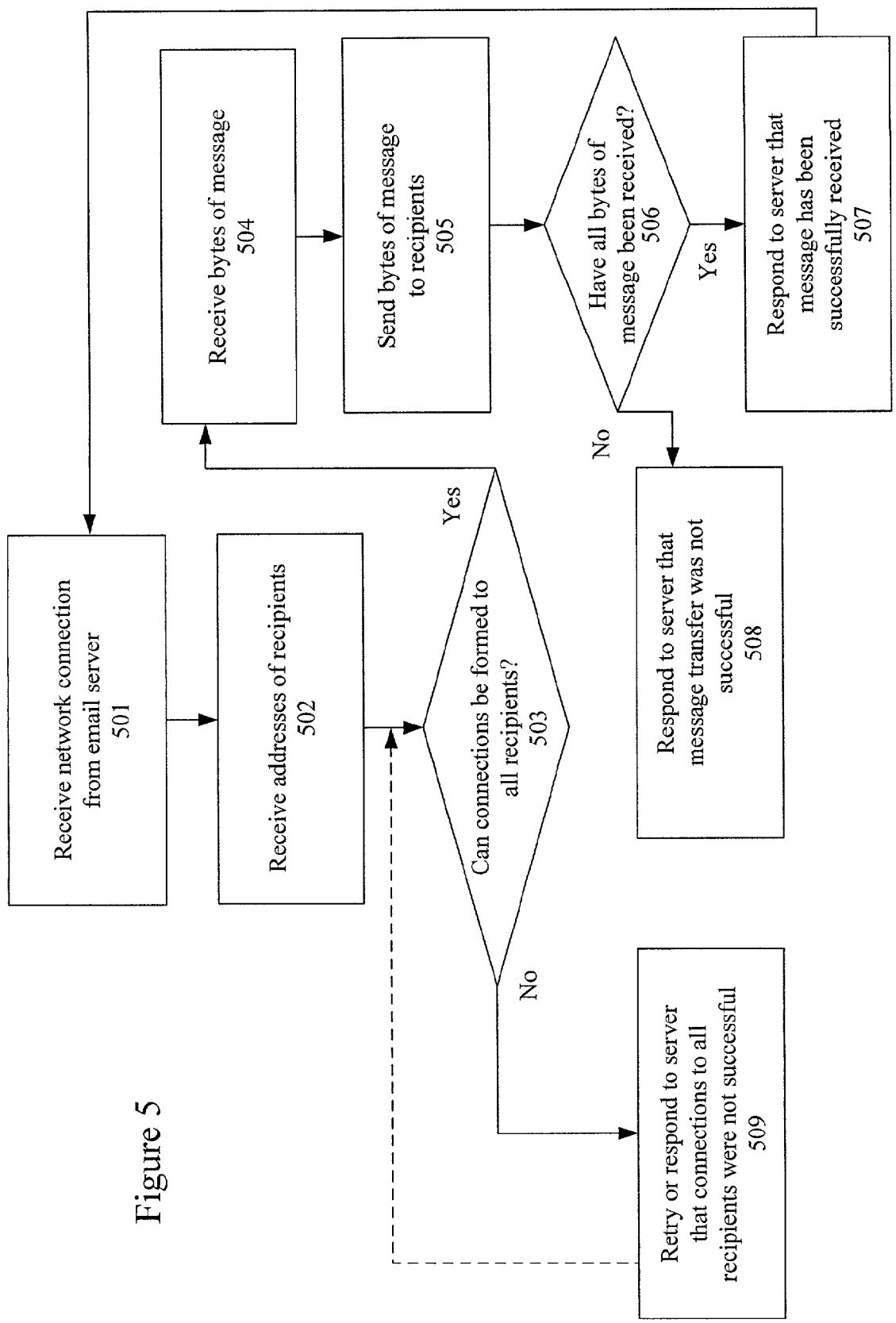
FIG. 5 illustrates another embodiment of a fast path MTA that eliminates the need for disk storage.

In accordance with another embodiment of the invention, the need for disk storage is completely eliminated. For example, referring to FIG. 5, the MTA receives a network connection from the email server in step 501. In step 502, the MTA receives addresses of the recipients. If connections can be formed to all recipients, as determined in step 503, then the MTA receives the bytes of the message in step 504. These bytes can be sent to the recipients in step 505. Note that steps 504 and 505 could be performed substantially simultaneously or step 505 could follow completion of step 504. If the recipients received all the bytes of the message, as determined in step 506, then the MTA can respond to the server that the messages was successfully received in step 507. If the recipients did not receive all bits, then the MTA can respond to the server that the message transfer was not successful in step 508. Note that if connections cannot be formed to all recipients in step 503, then either the MTA can respond to the server that connections to all recipients were not successful in step 509 or, alternatively, the MTA can retry connecting (i.e. returning to step 503) a predetermined number of times before responding to the server.

Figure 6:
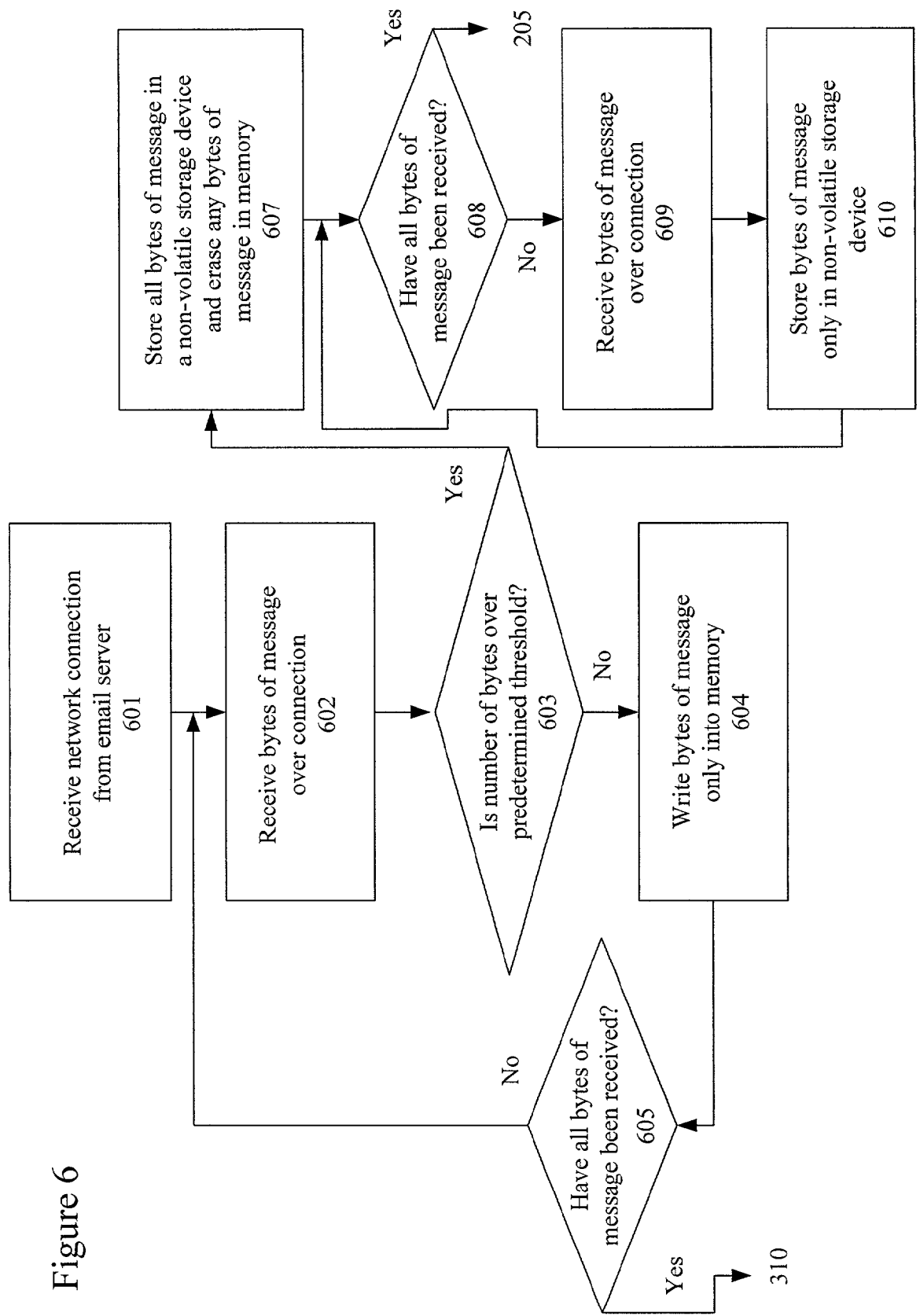
FIG. 6 illustrates another embodiment of a MTA that uses one of a fast path or a standard path.

In accordance with another embodiment of the invention, the need for disk storage is eliminated in the fast path MTA. For example, referring to FIG. 6, the MTA receives a network connection from the email server in step 601. In step 602, the MTA receives bytes of a message over that connection. If the total number of bytes (i.e. bytes written to memory in combination with those bytes just-received) does not exceed a predetermined threshold, as determined in step 603, then the received bytes are written to memory in step 604. If all bytes of the message have not been received, as determined in step 605, then the MTA returns to step 602 to receive additional bytes.

If the total number of bytes exceeds a predetermined threshold in step 603, then the fast path MTA is bypassed. Specifically, the bytes comprising the message are stored in a non-volatile storage device and any bytes of the message written to memory are erased in step 607. If all bytes of the message have not been received, as determined in step 608, then the MTA receives additional bytes of the message over the connection in step 609. These additional bytes of the message are stored only onto the non-volatile storage device in step 610. Once all bytes of the message have been received, as determined in step 608, the MTA can respond to the server that the message has been successfully received in step 205 (FIG. 2A). Steps 206-213 (FIG. 2B) can then be followed in accordance with a standard MTA. Finally, assuming the fast path MTA is still active and all bytes for the message have been received, as determined in step 605, then steps 310-320 (FIG. 3B) can be followed.

In one exemplary computer implemented embodiment, the MTA may be run on a variety of computer platforms including, for example: a SPARC station 20 or higher using the Sun™, Solaris™, or SPARC 2.6/2.7 operating system with at least 128 MB of RAM. In another embodiment, a PC platform (such as a Dell PowerEdge™1500) running either RedHat Linux 7.1 or Microsoft Windows™2000 can be used.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art. For example, although a non-volatile storage device is discussed herein, any type of stable storage device could be used. In one embodiment, the non-volatile storage device could be a disk. Note that the predetermined threshold could be set to any value, even a value that would eliminate the need for the non-volatile storage device. Accordingly, it is intended that the scope of the invention be defined by the following Claims and their equivalents.

The invention claimed is:

1. A method, implemented in hardware and software, comprising:
    receiving, over a network connection, from a first email server by a second email server, bytes of an email message addressed to one or more intended recipients;
    determining whether the number of bytes of the email message received at the second email server exceeds a predetermined threshold, wherein if not, then writing the email message only to a dynamic memory on the second email server, and wherein if so, then writing a portion of the bytes of the email message up to the predetermined threshold to the dynamic memory and storing a remainder of the bytes of the email message to a non-volatile storage on the second email server, the dynamic memory providing faster access time compared to the non-volatile storage; and
    sending all bytes of the email message from the second email server to the one or more intended recipients of the email message after the second email server has received all bytes of the email message.

2. The method of claim 1, wherein writing the email message to the memory and the non-volatile storage on the second email server further includes:
    determining whether all bytes of the email message have been received;
        wherein if not, then
            receiving additional bytes of the email message over the network connection; and
            writing the additional bytes onto the non-volatile storage; and
        wherein if so, then
            proceeding to re-route all bytes of the email message.

3. The method of claim 2, wherein if the number of bytes is less than the predetermined threshold and all bytes of the email message have been received, then proceeding to re-route all bytes of the email message.

4. The method of claim 3, further including:
    accessing the email message;
    sending all bytes of the email message to each destination; and
    determining whether all bytes of the email message were received successfully by each destination.

5. The method of claim 4, wherein if all bytes of the email message were received successfully by each destination, then
removing the email message from the dynamic memory and the non-volatile storage, if on the non-volatile storage; and
indicating a successful receipt of the email message.

6. The method of claim 5, wherein if all bytes of the email message were not received successfully by each destination, then
identifying all failed destinations;
storing all bytes of the email message on the non-volatile storage on the second email server; and
indicating a successful receipt of the email message.

7. The method of claim 6, further including retrying the failed destinations after a delay.

8. The method of claim 7, further including:
determining whether the email message is successfully received by the failed destinations,
wherein if not, then returning to the step of retrying the failed destinations after a delay; and
wherein if so, then removing the email message from the non-volatile storage on the second email server.

9. The method of claim 8, further including writing the email message to the non-volatile storage regardless of the predetermined threshold if a predetermined condition exists.

10. A non-transitory computer readable storage medium storing software program, the software program being executable to provide operations comprising:
receiving, over a network connection, from a first email server by a second email server, bytes of an email message addressed to one or more intended recipients;
determining if the number of bytes of the email message received at the second email server exceeds a predetermined threshold, wherein if not, then writing the email message only to a dynamic memory on the second email server, and wherein if so, then writing a portion of the bytes of the email message up to the predetermined threshold to the dynamic memory and storing a remainder of the bytes of the email message to a non-volatile storage on the second email server, the dynamic memory providing faster access time compared to the non-volatile storage; and
sending all bytes of the email message from the second email server to the one or more intended recipients of the email message after the second email server has received all bytes of the email message.

11. The computer readable medium of claim 10, wherein the operations further comprise:
determining if all bytes of the email message have been received,
wherein if not, then receiving additional bytes of the email message over the network connection and writing the additional bytes onto the non-volatile storage on the second email server, and
wherein if so, then proceeding to re-route all bytes of the email message.

12. The computer readable medium of claim 11, wherein the operations further comprise:
re-routing all bytes of the email message if the number of bytes is less than the predetermined threshold and all bytes of the email message have been received.

13. The computer readable medium of claim 12, wherein the operations further comprise:
accessing the email message;
sending the email message to each destination; and
determining if all bytes of the email message were received successfully by each destination.

14. The computer readable medium of claim 13, wherein the operations further comprise:
removing the email message from the dynamic memory and the non-volatile storage of the second email server, if on the non-volatile storage; and
indicating a successful receipt if all bytes of the email message were received successfully by each destination.

15. The computer readable medium of claim 14, wherein the operations further comprise:
identifying all failed destinations,
storing all bytes of the email message on the non-volatile storage on the second email server, and
indicating a successful receipt of the email message if the email message was not received successfully by each destination.

16. The computer readable medium of claim 15, wherein the operations further comprise:
retrying the failed destinations after a delay.

17. The computer readable medium of claim 16, wherein the operations further comprise:
determining whether the email message is successfully received by the failed destinations, wherein if not, then returning to retrying the failed destinations after a delay, and wherein if so, then removing the email message from the non-volatile storage on the second email server.

18. The computer readable medium of claim 17, wherein the operations further comprise:
writing the email message to the non-volatile storage regardless of the predetermined threshold if a predetermined condition exists.

19. A method, implemented in hardware and software, comprising:
receiving a number of bytes of an email message over a network connection;
determining whether the received number of bytes of the email message exceeds a predetermined threshold, wherein if not, then writing the email message only to a dynamic memory, and wherein if so, then writing the email message only to a non-volatile storage;
determining whether all bytes of the email message have been received;
wherein if not, then receiving additional bytes of the email message over the network connection, wherein if a total number of bytes of the email message exceeds the predetermined threshold then writing the total number of bytes only to the non-volatile storage and erasing all bytes of the email message from the dynamic memory; and
wherein if so, then proceeding to re-route the email message, accessing the email message;
sending all bytes of the email message to each destination; and
determining whether all bytes of the email message were received successfully by each destination;
wherein if the email message was received successfully by each destination, then
removing the email message from the dynamic memory or the non volatile storage; and
indicating a successful receipt of the email message; and
wherein if the email message was not received successfully by each destination, then
identifying all failed destinations;
storing the email message on the non-volatile storage; and
indicating a successful receipt of the email message.

20. The method of claim 19, further including retrying the failed destinations after delay.

21. The method of claim 20, further including:
   determining whether the email message is successfully received by the failed destinations,
      wherein if not, then
         returning to the step of retrying the failed destinations after a delay; and
      wherein if so, then
         removing the email message from the non-volatile storage.

22. The method of claim 21, further including writing the email message to the non-volatile storage regardless of the predetermined threshold if a predetermined condition exists.

* * * * *